United States Patent
Zhong et al.

(10) Patent No.: US 12,513,694 B2
(45) Date of Patent: Dec. 30, 2025

(54) METHOD FOR PROCESSING DATA SENDING, RESOURCE CONFIGURATION METHOD, AND RELATED DEVICE

(71) Applicant: VIVO MOBILE COMMUNICATION CO., LTD., Dongguan (CN)

(72) Inventors: Tingting Zhong, Dongguan (CN); Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 455 days.

(21) Appl. No.: 18/107,497

(22) Filed: Feb. 8, 2023

(65) Prior Publication Data

US 2023/0189258 A1    Jun. 15, 2023

Related U.S. Application Data

(63) Continuation of application No. PCT/CN2021/111506, filed on Aug. 9, 2021.

(30) Foreign Application Priority Data

Aug. 11, 2020    (CN) .......................... 202010803262.7

(51) Int. Cl.
*H04W 72/1268* (2023.01)
*H04W 72/51* (2023.01)
*H04W 76/27* (2018.01)

(52) U.S. Cl.
CPC ....... *H04W 72/1268* (2013.01); *H04W 72/51* (2023.01); *H04W 76/27* (2018.02)

(58) Field of Classification Search
CPC . H04W 72/1268; H04W 72/51; H04W 76/27; H04W 72/115; H04W 76/11; H04W 72/23; Y02D 30/70
See application file for complete search history.

(56) References Cited

U.S. PATENT DOCUMENTS

| | | | |
|---|---|---|---|
| 2020/0107396 A1* | 4/2020 | Wang | H04W 88/023 |
| 2020/0170069 A1* | 5/2020 | Shih | H04W 76/27 |
| 2020/0245334 A1* | 7/2020 | Phuyal | H04W 80/08 |

(Continued)

FOREIGN PATENT DOCUMENTS

| | | |
|---|---|---|
| CN | 111148255 A | 5/2020 |
| CN | 111371487 A | 7/2020 |

(Continued)

OTHER PUBLICATIONS

3GPP TS 38.331 V15.10.0 (Jul. 2020) (Year: 2020).*

(Continued)

*Primary Examiner* — Mohammed S Chowdhury
(74) *Attorney, Agent, or Firm* — IPX PLLC

(57) ABSTRACT

A method for processing data sending, a resource configuration method, and a related device are provided. The method for processing data sending includes: receiving a first configuration sent by a network device. The first configuration is a configuration related to transmission of a pre-configured Physical Uplink Shared Channel (PUSCH) resource, and is used to configure a dedicated uplink resource of at least one cell for the terminal. The method further includes sending uplink data based on the dedicated uplink resource of the at least one cell.

20 Claims, 4 Drawing Sheets

(56) References Cited

U.S. PATENT DOCUMENTS

2020/0396766 A1* 12/2020 Xue .............. H04L 5/0092
2022/0038997 A1* 2/2022 Höglund .............. H04W 48/10
2022/0256618 A1* 8/2022 Liu .............. H04W 72/115

FOREIGN PATENT DOCUMENTS

| CN | 111436084 A | 7/2020 |
|---|---|---|
| WO | 2020032659 A1 | 2/2020 |
| WO | 2020065620 A1 | 4/2020 |
| WO | 2020067820 A1 | 4/2020 |

OTHER PUBLICATIONS

3GPP TSG RAN WG1 Meeting #94bis; R1-1810607; Source: MediaTek Inc .; Title: Early transmission in preconfigured UL resources in NB-IoT; Chengdu, China, Oct. 8-12, 2018. (Year: 2018).*

3GPP TSG RAN WG1 Meeting #95; R1-1813762; Source: Huawei, HiSilicon; Title: Further topics for transmission in preconfigured UL resources; Spokane, USA, Nov. 12-16, 2018 (Year: 2018).*

International Search Report issued in corresponding International Application No. PCT/CN2021/111506, mailed Oct. 27, 2021, 4 pages.

Samsung, "Discussion on transmission in preconfigured UL resources for NB-IOT", 3GPP TSG RAN WG1 Meeting #95 R1-1812947, Nov. 2018, 6 pages.

Samsung, "Discussion on transmission in preconfigured UL resources for MTC", 3GPP TSG RAN WG1 Meeting #95 R1-1812940, Nov. 2018, 6 pages.

Second Office Action issued in related Chinese Application No. 202010803262.7, mailed Feb. 18, 2024, 8 pages.

Extended European Search Report issued in related European Application No. 21855481.4, mailed Nov. 21, 2023, 9 pages.

SONY: "Transmission in preconfigured UL resources", 3GPP Draft; R1-1808348, Aug. 2018, 4 pages.

* cited by examiner

Receive a first configuration sent by a network device, where the first configuration is a configuration related to transmission of a pre-configured physical uplink shared channel PUSCH resource — 301

FIG. 3

Send a first configuration, where the first configuration is a configuration related to transmission of a pre-configured physical uplink shared channel PUSCH resource — 401

FIG. 4

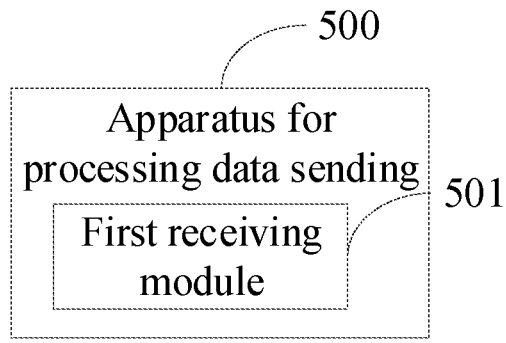

FIG. 5

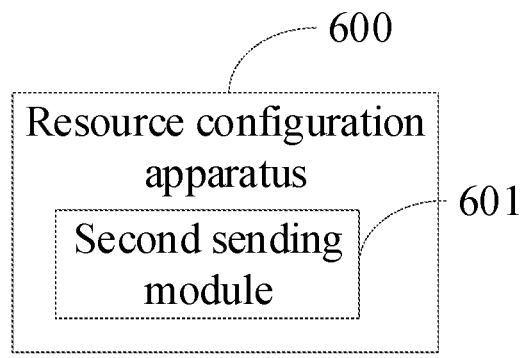

FIG. 6

METHOD FOR PROCESSING DATA SENDING, RESOURCE CONFIGURATION METHOD, AND RELATED DEVICE

CROSS-REFERENCE TO RELATED APPLICATIONS

This application is a continuation of International Application No. PCT/CN2021/111506, filed on Aug. 9, 2021, which claims priority to Chinese Patent Application No. 202010803262.7 filed on Aug. 11, 2020. The entire contents of each of the above-referenced applications are expressly incorporated herein by reference.

TECHNICAL FIELD

This application relates to the field of communication technologies, and in particular, to a method for processing data sending, a resource configuration method, and a related device.

BACKGROUND

With the development of communication technologies, an idle state and an inactive state are introduced in a communication system. Usually, when a terminal is in an idle or inactive state, the 2-step or 4-step RACH procedure needs to be performed to enable a connected state in which uplink data is sent. As a result, a latency in sending the uplink data is relatively high.

SUMMARY

Embodiments of this application provides a method for processing data sending, a resource configuration method, and a related device.

A first aspect provides a method for processing data sending, performed by a terminal, and including:
receiving a first configuration sent by a network device, where the first configuration is a configuration related to transmission of a pre-configured physical uplink shared channel PUSCH resource, and is used to configure a dedicated uplink resource of at least one cell for the terminal; and sending uplink data based on the dedicated uplink resource of the at least one cell.

A second aspect provides a resource configuration method, performed by a network device, and including:
sending a first configuration, where the first configuration is a configuration related to transmission of a pre-configured physical uplink shared channel PUSCH resource, and is used to configure a dedicated uplink resource of at least one cell for the terminal.

A third aspect provides an apparatus for processing data sending, including:
a first receiving module, configured to receive a module, and configured to receive a first configuration sent by a network device, where the first configuration is a configuration related to transmission of a pre-configured physical uplink shared channel PUSCH resource, and is used to configure a dedicated uplink resource of at least one cell for the terminal; and sending uplink data based on the dedicated uplink resource of the at least one cell.

A fourth aspect provides a resource configuration apparatus, including:
a second sending module, configured to send a first configuration, where the first configuration is a configuration related to transmission of a pre-configured physical uplink shared channel PUSCH resource, and is used to configure a dedicated uplink resource of at least one cell for the terminal.

A fifth aspect provides a terminal. The terminal includes a processor, a memory, and a program or an instruction that is stored in the memory and that can be run on the processor, where when the program or instruction is executed by the processor, the steps of the method according to the first aspect are implemented.

A sixth aspect provides a network device. The network side device includes a processor, a memory, and a program or an instruction that is stored in the memory and that can be run on the processor, where when the program or instruction is executed by the processor, the steps of the method according to the second aspect are implemented.

A seventh aspect provides a readable storage medium. The readable storage medium stores a program or an instruction, and when the program or the instruction is executed by a processor, the steps of the method according to the first aspect are implemented, or the steps of the method according to the second aspect are implemented.

An eighth aspect provides a chip. The chip includes a processor and a communication interface, the communication interface is coupled to the processor, and the processor is configured to run a program or an instruction of a network device to implement the method according to the second aspect.

A ninth aspect provides a computer software product. The computer software product is stored in a non-volatile storage medium, and the software product is configured to be executed by at least one processor to implement the steps of the method according to the first aspect or the steps of the method according to the second aspect.

A tenth aspect provides a communication device. The communication device is configured to perform the method according to the first aspect, or perform the method according to the second aspect.

In the embodiments of this application, the first configuration sent by the network device is received, where the first configuration is a configuration related to transmission of the pre-configured physical uplink shared channel PUSCH resource, and is used to configure the dedicated uplink resource of the at least one cell for the terminal; and the uplink data is sent based on the dedicated uplink resource of the at least one cell. In this way, in the embodiments of this application, the terminal can directly send data based on the dedicated uplink resource, without having to enter a connected state for data sending, and therefore, a latency in uplink data sending is reduced.

BRIEF DESCRIPTION OF DRAWINGS

FIG. 3 is a flowchart of a method for processing data sending according to an embodiment of this application;

FIG. 4 is a flowchart of a resource configuration method according to an embodiment of this application;

FIG. 5 is a flowchart of an apparatus for processing data sending according to an embodiment of this application;

FIG. 6 is a flowchart of a resource configuration apparatus according to an embodiment of this application;

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the description and the claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that the technology described in the embodiments of this application is not limited to a Long Time Evolution (LTE)/LTE-Advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. However, a New Radio (NR) system is described below as an example, and the term NR is used in most of the descriptions, although these technologies can also be used in an application other than an application of the NR system, for example, a 6th Generation (6G) communication system.

Figure 1:
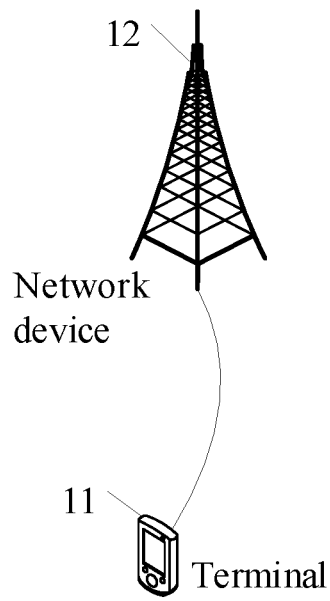
FIG. 1 is a structural diagram of a network system to which an embodiment of this application can be applied.

FIG. 1 is a block diagram of a wireless communication system to which embodiments of this application can be applied. The wireless communication system includes a terminal 11 and a network device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device or a Vehicle User Equipment (VUE), or Pedestrian User Equipment (PUE). The wearable device includes a band, a headset, eyeglasses, or the like. It should be noted that a type of the terminal 11 is not limited in the embodiments of this application. The network device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Network (WLAN) access point, a Wireless Fidelity (WiFi) node, a Transmission and Reception Point (TRP) or another appropriate term in the art. Provided that the same technical effects are achieved, the base station is not limited to specific technical vocabulary. It should be noted that in some embodiments of this application, the base station in the NR system is merely used as an example, but does not limit a specific type of the base station.

For ease of description, the following describes some content in the embodiments of this application:

1. A configuration related to transmission of a pre-configured Physical Uplink Shared Channel (PUSCH) resource, for example, a configuration related to a transmission mode of a pre-configured PUSCH resource for Small Data Transmission (SDT) in NR.

The pre-configured PUSCH resource may include a pre-configured PUSCH or a Pre-configured Uplink Resource (PUR).

2. A process about a PUR configuration request (PUR-ConfigurationRequest) message in the LTE Narrow Band Internet of Things (NB-IoT).

Figure 2:
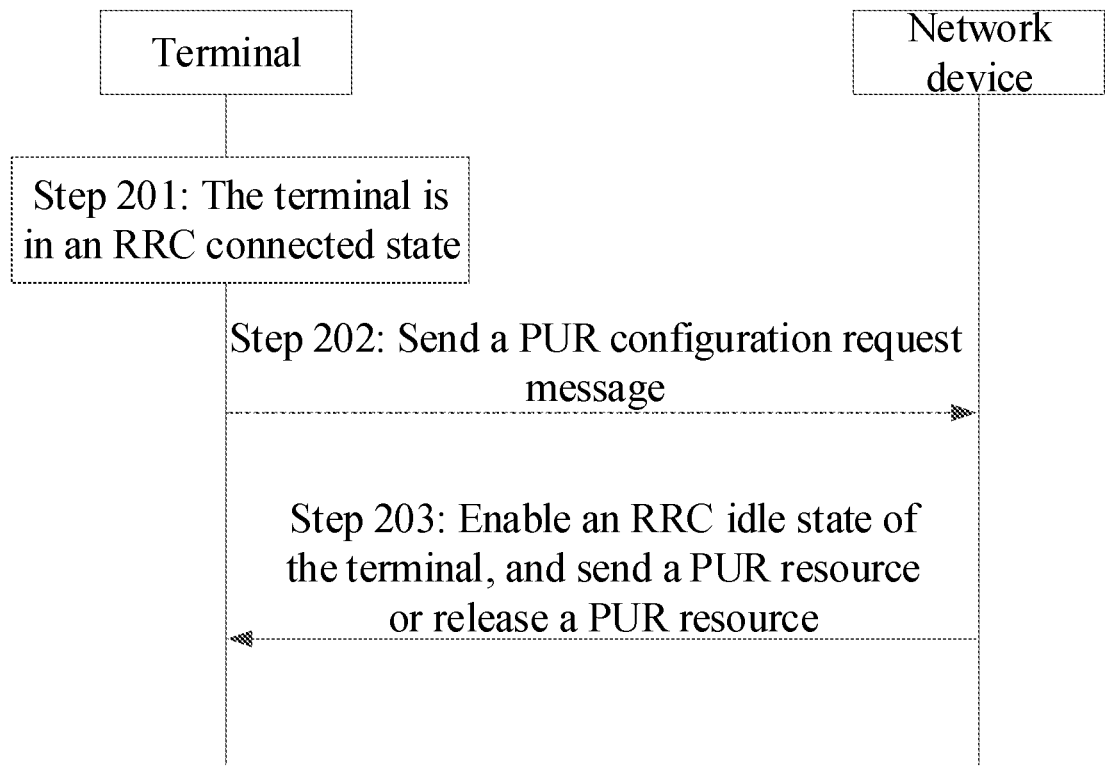
FIG. 2 is a flowchart of obtaining a PUR configuration according to an embodiment of this application.

In some embodiments, the purpose of the process is to show a base station that UE is interested in a PUR configuration and provides PUR-related information, or to show that UE has no more interest in a PUR configuration. As shown in FIG. 2, the method includes the following steps:

Step 201: UE is in a Radio Resource Control CONNECTED (RRC_CONNECTED) state, and a serving cell of a terminal supports PUR transmission.

Step 202: The UE may send the message PURConfigurationRequest to a base station to show that the UE is interested in a PUR configuration or has no more interest in a PUR configuration. In a case in which the UE is interested in a PUR configuration, a parameter about the PUR configuration, for example, a Transmit Block Size (TBS) and a periodicity, is provided in the message PURConfigurationRequest, where the periodicity may be understood as a periodicity of a PUR resource; or in a case in which the UE has no more interest in a PUR configuration, a PUR release request (pur-ReleaseReq) is included in the message PURConfigurationRequest.

Step 203: A network device enables RRC_IDLE of the UE, and may provide a PUR resource to the UE or release a PUR resource that the UE has had based on at least one of the message PURConfigurationRequest, a subscription message, and local policies. Details of indications of a PUR configuration and a PUR release are included in a message RRCConnectionRelease.

Overall, when the UE wants to obtain a PUR configuration, update a PUR configuration, and release a PUR configuration, it is implemented by sending the message PUR-ConfigurationRequest to a network.

It should be understood that step 202 is an exemplary step, that is, no matter whether the terminal sends the message PURConfigurationRequest, the network device can enable RRC_IDLE of the UE, and may provide a PUR resource to the UE or release a PUR resource that the UE has had.

3. Brief introduction of RRC connection control.

An RRC resume (RRCResume) procedure is to resume an RRC connection or update a Radio Access Network (RAN) notification area. In a case in which the network device cannot obtain or verify an inactive AS context of the UE, the network device sends an RRC setup (RRCSetup) message to the UE. RRC connection resume includes resuming a Signalling Radio Bearer (SRB) and a Data Radio Bearer (DRB).

4. Brief introduction of a paging procedure.

A paging procedure is to transmit a paging message to idle UE or inactive UE. When the inactive UE receives the paging message, if a UE-identity included in a paging record (PagingRecord) matches a full Inactive Radio Network Temporary Identifier (I-RNTI) of the UE, the paging message is for the UE. Further, in a case in which the UE is configured with an access identity 1 at an upper layer, the UE initiates an RRC resume procedure, and resumeCause is multimedia priority service-Priority Access (mps-Priority Access); or in a case in which the UE is configured with an access identity 2 at an upper layer, the UE initiates an RRC resume procedure, and resumeCause is mission critical Service-Priority Access (mcs-Priority Access); or in a case in which the UE is configured with one or more access identities equal to 11 to 15 at an upper layer, the UE initiates an RRC resume procedure, and resumeCause is high priority access (highPriorityAccess); or in another case, the UE initiates an RRC resume procedure, and resumeCause is mobile terminated-Access (mt-Access). It should be noted that an access category of an RRC resume procedure related to paging is 0.

The method for processing data sending according to the embodiments of this application is described in detail below in conjunction with the accompanying drawings in embodiments and application scenarios thereof.

Refer to FIG. 3. FIG. 3 is a flowchart of a method for processing data sending according to an embodiment of this application. The method is performed by a terminal, as shown in FIG. 3, and includes the following steps:

Step 301: receiving a first configuration sent by a network device, where the first configuration is a configuration related to transmission of a pre-configured physical uplink shared channel PUSCH resource, and is used to configure a dedicated uplink resource of at least one cell for the terminal; and sending uplink data based on the dedicated uplink resource of the at least one cell.

In this embodiment of this application, the at least one cell may include a serving cell, and may further include N neighboring cells, where N is a positive integer. In other words, the at least one cell may be one cell or at least two cells.

The network device may be understood as a device belonging to a current serving cell of the terminal. In this embodiment, the terminal may send uplink data based on a dedicated uplink resource corresponding to the current serving cell, so that a latency in uplink data sending is reduced.

Further, in an embodiment, in this case in which the first configuration is used to configure a dedicated uplink resource of at least two cells for the terminal, a dedicated uplink resource of a neighboring cell is configured for the terminal. In this case, in a cell handover process, if a target neighboring cell to be handed over to is configured with a dedicated uplink resource, uplink data can be sent directly based on a pre-configured dedicated uplink resource after the handover process, thereby further reducing a latency in uplink data sending and ensuing continuity of uplink data. Meanwhile, reliability of uplink data sending is enhanced.

In the embodiments of this application, the first configuration sent by the network device is received, where the first configuration is a configuration related to transmission of the pre-configured physical uplink shared channel PUSCH resource, and is used to configure the dedicated uplink resource of the at least one cell for the terminal; and the uplink data is sent based on the dedicated uplink resource of the at least one cell. In this way, in the embodiments of this application, the terminal can directly send data based on the dedicated uplink resource, without having to enter a connected state for data sending, and therefore, a latency in uplink data sending is reduced.

For example, in an embodiment, the first configuration includes at least one of the following:
area information; and
a configuration identifier corresponding to the area information.

In some embodiments, the area information may include at least one of the following:
a cell-related identifier;
an identifier of a network node;
an identifier of a radio access network notification area;
a Tracking Area (TA); and
a Registration Area (RA).

The cell-related identifier may include at least one of the following: a physical cell identifier; a cell global identifier; a cell group identifier; and a cell type identifier. A cell group may include a Master Cell Group (MCG) or a Secondary Cell Group (SCG). A cell type may include any one of the following: a Primary Cell (PCell), a Primary Secondary Cell (PSCell), a special cell, and a Secondary Cell (SCell).

In some embodiments, the identifier of a network node may include at least one of the following: a global gNB identifier; and a gNB identifier.

For example, in an embodiment, the configuration identifier includes at least one of the following:
a first identifier, where the first identifier is used to indicate a set of configurations related to transmission of a pre-configured PUSCH resource that are associated with the cell; and
a second identifier, where the second identifier is used to indicate a part of the set of configurations related to transmission of the pre-configured PUSCH resource that are associated with the cell.

In this embodiment, the set of configurations related to transmission of the pre-configured PUSCH resource may include a quantity of PUSCH occasions, a TBS, a TAT timer, and the like. When the first identifier is used, different configurations related to transmission of a pre-configured PUSCH resource are associated with different cells. In a case in which configurations related to transmission of pre-configured PUSCH resources corresponding to M cells are the same, the M cells may be associated with a configuration related to transmission of a set of configurations related to transmission of a pre-configured PUSCH resource, and M is a positive integer. When the second identifier is used, the part of the set of configurations related to transmission of the pre-configured PUSCH resource may be set to different values. For example, a target configuration in the set of configurations related to transmission of the pre-configured PUSCH resource has at least two different values, and the different values corresponding to the target configuration are associated with different second identifiers, where the second identifier associated with a target value is used to indicate L cells associated with the target value, and L is a positive integer.

It should be understood that no matter whether there is a configuration identifier corresponding to the area information, content of a configuration used in each cell in a specified area needs to be learned. For example, in an embodiment, not any configuration-related identifier at all means that all cells in an area use a same configuration. In another embodiment, it is assumed that there two sets of configurations, namely, a configuration 1 and a configuration 2. The configuration 1 is applicable to a cell 1, a cell 2, and a cell 3, and the configuration 2 is applicable to a cell 4, a cell 5, and a cell 6. In this case, one first identifier corresponding to the cell 1, the cell 2, and the cell 3 may be used and be associated with the configuration 1; and another first identifier corresponding to the cell 4, the cell 5, and the cell 6 may be used and be associated with the configuration 2. For example, an identifier 1 is associated with the cell 1, the cell 2, and the cell 3, and an identifier 2 is associated with the cell 4, the cell 5, and the cell 6. For example, the identifier 1 may include an identifier related to the cell 1, an identifier related to the cell 2, and an identifier related to the cell 3; and the identifier 2 may include an identifier related to the cell 4, an identifier related to the cell 5, and an identifier related to the cell 6.

In another embodiment, it is assumed that a Time Alignment Timer (TAT) in a configuration has two different values, namely, a TAT timer 1 and a TAT timer 2. The TAT timer 1 is applicable to the cell 1, the cell 2, and the cell 3, and the TAT timer 2 is applicable to the cell 4, the cell 5, and the cell 6. In this case, one second identifier corresponding to the cell 1, the cell 2, and the cell 3 may be used and be associated with the TAT timer 1; and another second identifier corresponding to the cell 4, the cell 5, and the cell 6 may be used and be associated with the TAT timer 2.

For example, in an embodiment, before the step of receiving a first configuration sent by a network device, the method further includes:

receiving first indication information sent by the network device, where the first indication information is used to indicate at least one of the following: whether the network device supports the first configuration; and whether the network device supports a first transmission mode.

In this embodiment of this application, the network device may send the first indication information by using a System Information Block (SIB) message. In some embodiments, the network device may use one bit to indicate whether the first configuration is supported, for example, may use 0 to indicate that the network device does not support the first configuration, and use 1 to indicate that the first configuration is supported. The first transmission mode may be understood as a transmission mode corresponding to the first configuration. In other words, the first transmission mode may be understood as transmission mode of a pre-configured PUSCH resource for SDT in NR.

In some embodiments, before the step of receiving a first configuration sent by a network device, the method further includes:

receiving second indication information sent by the network device, where the second indication information is used to indicate whether to allow the terminal reports assistance information, and the assistance information is used to assist the network device to determine the first configuration.

In this embodiment of this application, the second indication information includes at least one of the following: a third identifier and a timer, where the terminal is allowed or not allowed to report the assistance information within a runtime of the timer. In some embodiments, the third identifier may be understood as an indication value of a bit. For example, 0 may be used to indicate that the terminal is not allowed to report the assistance information, and 1 may be used to indicate that the terminal is allowed to report the assistance information.

When the timer is indicated, the terminal is allowed or not allowed to report the assistance information within the runtime of the timer. The runtime of the timer may be indicated by the network device, or may be agreed in a protocol. This is not further limited herein.

It should be understood that in an embodiment, the third identifier and the timer can be used together to indicate whether the terminal is allowed to report. In this case, the third identifier may be used to indicate whether reporting is allowed within the runtime of the timer. For example, in a case in which the third identifier indicates that reporting of the assistance information is allowed, the terminal may understand that the network device allows the terminal to report the assistance information within the runtime of the timer, and that in a case in which the timer expires or the timer is not enabled, the network device does not allow the terminal to report the assistance information. On the contrary, in a case in which the third identifier indicates that reporting of the assistance information is not allowed, the terminal may understand that the network device does not allow the terminal to report the assistance information within the runtime of the timer, and that in a case in which the timer expires or the timer is not enabled, the network device allows the terminal to report the assistance information.

Further, before the step of receiving a first configuration sent by a said network device, the method further includes:

sending the assistance information to the network device.

The terminal sends the assistance information to the network device, to assist the network device to determine the first configuration. In this way, applicability of the first configuration can be improved, and therefore reliability of uplink data sending can be enhanced.

It should be understood that in this embodiment, no matter whether the terminal sends the assistance information to the network device, the network device may perform a configuration by using system information or dedicated signaling, to indicate whether the UE is allowed to report the assistance information to a network.

In this embodiment, the network device includes at least one of the following:

a device supporting the first configuration;
a device supporting the first transmission mode;
a device not supporting the first configuration; and
a device not supporting the first transmission mode.

In this embodiment, the terminal may send the assistance information only to a network device supporting the first configuration and/or the first transmission mode, or it may be set that no matter whether a network device supports the first configuration and/or the first transmission mode, the assistance information may be sent to the network device.

It should be understood that the first configuration may be an initial configuration, that is, the assistance information is sent before a configuration related to transmission of a pre-configured PUSCH resource is initially sent; or the first configuration may be a configuration after a configuration related to transmission of a pre-configured PUSCH resource is initially sent, that is, the terminal may send the assistance information after receiving a first configuration that is sent last time, to help the network device to re-determine the first configuration.

In some embodiments, the assistance information may include at least one of the following:

area information; and
a configuration identifier corresponding to the area information.

It should be understood that the area information and configuration identifier are identical to area information and a configuration identifier in the first configuration. A related description on area information and a configuration identifier in the first configuration may be referred to. This is not further limited herein.

In some embodiments, a condition of initiating the terminal to send the assistance information to the network device includes at least one of the following:
the network device allows the terminal to send the assistance information;
the terminal is interested in the first configuration or is interested in the first transmission mode;
the terminal is not interested in the first configuration or is not interested in the first transmission mode;
at least one item in the first configuration does not match a service feature of the terminal;
a serving cell does not belong to an area indicated by the first configuration;
the first configuration is updated;
a size of a medium access control protocol data unit including uplink data is less than or equal to a second preset value, where the second preset value is a transmit block size defined based on a type of the terminal;
a status of the terminal is an RRC connected state; and
a status of the terminal is a non-RRC connected state.

In this embodiment, that the terminal is not interested in the first configuration may be stated as that the terminal is not interested in a current first configuration. That the terminal is not interested in the first configuration may be understood as: being not interested in a part of or all the first configuration. In this case, the assistance information is sent to assist the network device to determine a first configuration to be sent next time or assist the network device to re-determine the first configuration. Being not interested in a configuration may be understood as: after the first configuration is received, being not interested in a configuration thereof, or after uplink data is sent based on a configuration, being not interested in the configuration any more, that is, at a current moment, being not interested in the configuration. Being not interested in the first transmission mode may be understood as being not interested in the first transmission mode any more.

In a case in which a status of the UE has to be an RRC connected state, when the UE is a non-RRC connected state, the UE in an idle state initiates an RRC connection establishment procedure to enable a connected state to send the assistance information to the network device; or the UE in an inactive state initiates an RRC connection resume procedure to enable a connected state to send the assistance information to the network device.

In some embodiments, in the RRC connection establishment procedure or the RRC connection resume procedure, a value of establishmentCause or resumeCause includes at least one of the following:
the value of establishmentCause or resumeCause is an existing defined value, for example, mo-data, mo-signal, or the like; and
the value of establishmentCause or resumeCause is a newly set value, for example, mo-RRCmessage, PUR-ConfigurationRequest, or the like, where the value enables the UE to directly initiate an RRC connection establishment or resume procedure when needing to send the assistance information.

In some embodiments, after the step of receiving a first configuration sent by a network device, the method further includes:
receiving a paging message sent by the network device, where the paging message is used to notify an update of the first configuration;
initiating a radio resource control RRC resume procedure; and
receiving the updated first configuration sent by the network device based on the RRC resume procedure.

In this embodiment, the network device may send a RAN paging message to the terminal, where an anchor base station of the terminal may forward the paging message to all base stations in a target area. For example, after receiving the paging message, the terminal may initiate an RRC resume procedure, and obtain, through the RRC resume procedure, a latest configuration sent by the network device. In this way, the network device can control a status of the first configuration of the terminal with flexibility in different moments based on a requirement of the terminal or according to local decision-making, to not only ensure that the terminal can use a dedicated uplink resource to normally send uplink data but also prevent a waste of dedicated uplink resource. The target area may be a radio access network notification area, or may be an area corresponding to the area information, that is, an area corresponding to all cells configured with the dedicated uplink resource.

In some embodiments, when the terminal initiates the RRC connection resume procedure, a target object in Unified Access Control (UAC) is not configured or is configured as the first preset value, where the target object includes at least one of an access category and an access identity.

In this embodiment, that the target object is not configured may be understood as: there is no need to verify this access attempt, and the access attempt is directly allowed. In this way, a time for completing the RRC resume procedure can be reduced, thereby reducing an access time.

The first preset value is a first value or a second value configured in an RRC layer or an upper layer (or upper layers), and the second value is a new value relative to the first value.

The first value may be understood as an existing defined value. For example, the access category is 0, the access identity is 0, and so on. The second value may be understood as a newly added value based on an existing defined value. For example, the access category is 11, and the access identity is 16.

In some embodiments, a resume cause value of the RRC connection resume procedure includes at least one of the following:
a third value; and
a fourth value, where the fourth value is a new value relative to the third value.

The third value is an existing defined value, for example, mt-Access and mps-Priority Access. The fourth value is a newly set value, and the fourth value is used to indicate at least one of the following:
a configuration update of the pre-configured PUSCH resource;
a configuration update of a pre-configured uplink resource PUR; and
a PUR configuration request.

For example, in an embodiment, the third value may be used to indicate at least one of the following: a configuration update of the pre-configured PUSCH resource; a PUR configuration update; and a PUR configuration request. For example, the third value may further be used to indicate at least one of a configuration update of the pre-configured PUSCH resource; a PUR configuration update; and a PUR configuration request beyond being used to indicate an existing definition.

Clearly, in some embodiments, the third value may not be used to indicate at least one of the following: a configuration update of the pre-configured PUSCH resource; a PUR configuration update; and a PUR configuration request.

In some embodiments, when the terminal initiates the RRC connection resume procedure, an action of the terminal complies with at least one of the following:
skipping resuming any data radio bearer; and
skipping using the first configuration for transmission.

In this embodiment, because the terminal initiates the RRC connection resume procedure based on the paging message, and the first configuration of the network device is updated, in this case, no data radio bearer is resumed and the first configuration is not used for transmission, thereby preventing an error in uplink sending and undesired consumption of electrical energy.

Refer to FIG. 4. FIG. 4 is a flowchart of a resource configuration method according to an embodiment of this application. The method is performed by a network device. As shown in FIG. 4, the method includes the following steps:

Step 401: sending a first configuration, where the first configuration is a configuration related to transmission of a pre-configured physical uplink shared channel PUSCH resource, and is used to configure a dedicated uplink resource of at least one cell for the terminal.

In some embodiments, the first configuration includes at least one of the following:
area information; and
a configuration identifier corresponding to the area information.

In some embodiments, before the step of sending a first configuration, the method further includes:
sending first indication information to the terminal, where the first indication information is used to indicate at least one of the following: whether the network device supports the first configuration; and whether the network device supports a first transmission mode.

In some embodiments, before the step of sending a first configuration, the method further includes:
sending second indication information to the terminal, where the second indication information is used to indicate whether to allow the terminal reports assistance information, and the assistance information is used to assist the network device to determine the first configuration.

In some embodiments, the second indication information includes at least one of the following: a third identifier and a timer, where the terminal is allowed or not allowed to report the assistance information within a runtime of the timer.

In some embodiments, before the step of sending a first configuration, the method further includes:
receiving the assistance information sent by the terminal.

In some embodiments, the network device includes at least one of the following:
a device supporting the first configuration;
a device supporting the first transmission mode;
a device not supporting the first configuration; and
a device not supporting the first transmission mode.

In some embodiments, the assistance information includes at least one of the following: area information; and
a configuration identifier corresponding to the area information.

In some embodiments, the area information includes at least one of the following:
a cell-related identifier;
an identifier of a network node;
a radio access network notification area;
a tracking area; and
a registration area.

In some embodiments, the cell-related identifier includes at least one of the following:
a physical cell identifier;
a cell global identifier;
a cell group identifier; and
a cell type identifier.

In some embodiments, the identifier of a network node includes at least one of the following:
a global gNB identifier; and
a gNB identifier.

In some embodiments, the configuration identifier includes at least one of the following:
a first identifier, where the first identifier is used to indicate a set of configurations related to transmission of a pre-configured PUSCH resource that are associated with the cell; and
a second identifier, where the second identifier is used to indicate a part of the set of configurations related to transmission of the pre-configured PUSCH resource that are associated with the cell.

In some embodiments, after the step of sending a first configuration, the method further includes:
in a case in which at least a part of the first configuration is updated, performing a target operation, where the target operation includes:
sending a paging message to a terminal; and
forwarding the paging message to a base station in a target area via an anchor base station, where
the paging message is used to notify that the first configuration is updated.

In some embodiments, in a case in which at least a part of the first configuration is updated, after the step of performing a target operation, the method further includes:
sending the updated first configuration to the terminal based on a radio resource control RRC connection resume procedure initiated by the terminal.

In some embodiments, when the terminal initiates the RRC connection resume procedure, a target object in unified access control is not configured or is configured as the first preset value, where the target object includes at least one of an access category and an access identity.

In some embodiments, the first preset value is a first value or a second value configured in an RRC layer or an upper layer, and the second value is a new value relative to the first value.

In some embodiments, a resume cause value of the RRC connection resume procedure includes at least one of the following:
a third value; and
a fourth value, where the fourth value is a new value relative to the third value.

In some embodiments, the fourth value is used to indicate at least one of the following:
a configuration update of the pre-configured PUSCH resource;
a configuration update of a pre-configured uplink resource PUR; and
a PUR configuration request.

It should be noted that this embodiment is used as an implementation of a network device corresponding to the embodiment shown in FIG. 3. For an implementation of this embodiment, refer to related descriptions of the embodiment shown in FIG. 3, and a same effect can be achieved. To avoid repetition, details are not described herein again.

It should be noted that, the method for processing data sending provided in the embodiments of this application may be performed by an apparatus for processing data sending or a control module that is in the apparatus for processing data sending and that is configured to perform the method for processing data sending. In the embodiments of this application, that the apparatus for processing data sending performs the method for processing data sending is used as an example to describe the apparatus for processing data sending provided in the embodiments of this application.

Refer to FIG. 5. FIG. 5 is a structural diagram of an apparatus for processing data sending according to an embodiment of this application. As shown in FIG. 5, the apparatus for processing data sending 500 includes:

a first receiving module 501, configured to receive a module, and configured to receive a first configuration sent by a network device, where the first configuration is a configuration related to transmission of a pre-configured physical uplink shared channel PUSCH resource, and is used to configure a dedicated uplink resource of at least one cell for the terminal; and sending uplink data based on the dedicated uplink resource of the at least one cell.

In some embodiments, the first configuration includes at least one of the following:
area information; and
a configuration identifier corresponding to the area information.

In some embodiments, the first receiving module 501 is further configured to receive first indication information sent by the network device, where the first indication information is used to indicate at least one of the following: whether the network device supports the first configuration; and whether the network device supports a first transmission mode.

In some embodiments, the first receiving module 501 is further configured to receive second indication information sent by the network device, where the second indication information is used to indicate whether to allow the terminal reports assistance information, and the assistance information is used to assist the network device to determine the first configuration.

In some embodiments, the second indication information includes at least one of the following: a third identifier and a timer, where the terminal is allowed or not allowed to report the assistance information within a runtime of the timer.

In some embodiments, the apparatus for processing data sending 500 further includes:
a first sending module, configured to send assistance information to the network device.

In some embodiments, the network device includes at least one of the following:
a device supporting the first configuration;
a device supporting the first transmission mode;
a device not supporting the first configuration; and
a device not supporting the first transmission mode.

In some embodiments, the assistance information includes at least one of the following: area information; and
a configuration identifier corresponding to the area information.

In some embodiments, the area information includes at least one of the following:
a cell-related identifier;
an identifier of a network node;
a radio access network notification area;
a tracking area; and
a registration area.

In some embodiments, the cell-related identifier includes at least one of the following:
a physical cell identifier;
a cell global identifier;
a cell group identifier; and
a cell type identifier.

In some embodiments, the identifier of a network node includes at least one of the following:
a global gNB identifier; and
a gNB identifier.

In some embodiments, the configuration identifier includes at least one of the following:
a first identifier, where the first identifier is used to indicate a set of configurations related to transmission of a pre-configured PUSCH resource that are associated with the cell; and
a second identifier, where the second identifier is used to indicate a part of the set of configurations related to transmission of the pre-configured PUSCH resource that are associated with the cell.

In some embodiments, a condition of initiating the terminal to send the assistance information to the network device includes at least one of the following:
the network device allows the terminal to send the assistance information;
the terminal is interested in the first configuration or is interested in the first transmission mode;
the terminal is not interested in the first configuration or is not interested in the first transmission mode;
at least one item in the first configuration does not match a service feature of the terminal;
a serving cell does not belong to an area indicated by the first configuration;
the first configuration is updated;
a size of a medium access control protocol data unit including uplink data is less than or equal to a second preset value, where the second preset value is a transmit block size defined based on a type of the terminal;
a status of the terminal is an RRC connected state; and
a status of the terminal is a non-RRC connected state.

In some embodiments, the first receiving module 501 is further configured to receive a paging message sent by the network device, where the paging message is used to notify the terminal about an update of the first configuration; and
the first sending module is further configured to: initiate a radio resource control RRC resume procedure; and receive the updated first configuration sent by the network device based on the RRC resume procedure.

In some embodiments, when the terminal initiates the RRC connection resume procedure, a target object in unified access control is not configured or is configured as the first preset value, where the target object includes at least one of an access category and an access identity.

In some embodiments, the first preset value is a first value or a second value configured in an RRC layer or an upper layer, and the second value is a new value relative to the first value.

In some embodiments, a resume cause value of the RRC connection resume procedure includes at least one of the following:
a third value; and
a fourth value, where the fourth value is a new value relative to the third value.

In some embodiments, the fourth value is used to indicate at least one of the following:
a configuration update of the pre-configured PUSCH resource;
a configuration update of a pre-configured uplink resource PUR; and
a PUR configuration request.

In some embodiments, when the terminal initiates the RRC connection resume procedure, an action of the terminal complies with at least one of the following:
skipping resuming any data radio bearer; and
skipping using the first configuration for transmission.

The apparatus for processing data sending provided in the embodiments of this application can implement various processes implemented by the network device in the method embodiment of FIG. 3. To avoid repetition, details are not described herein again.

It should be noted that the resource configuration method provided in the embodiments of this application may be performed by a resource configuration apparatus, or a control module that is in the resource configuration apparatus and that is configured to perform the resource configuration method. In the embodiments of this application, that the resource configuration apparatus performs the resource configuration method is used as an example to describe the resource configuration apparatus provided in the embodiments of this application.

Refer to FIG. 6. FIG. 6 is a structural diagram of a resource configuration apparatus according to an embodiment of this application. As shown in FIG. 6, the resource configuration apparatus 600 includes:
a second sending module 601, configured to send a first configuration, where the first configuration is a configuration related to transmission of a pre-configured physical uplink shared channel PUSCH resource, and is used to configure a dedicated uplink resource of at least one cell for the terminal.

In some embodiments, the first configuration includes at least one of the following:
area information; and
a configuration identifier corresponding to the area information.

In some embodiments, the second sending module 601 is further configured to:
send first indication information to the terminal, where the first indication information is used to indicate at least one of the following: whether the network device supports the first configuration; and whether the network device supports a first transmission mode.

In some embodiments, the second sending module 601 is further configured to:
send second indication information to the terminal, where the second indication information is used to indicate whether to allow the terminal reports assistance information, and the assistance information is used to assist the network device to determine the first configuration.

In some embodiments, the second indication information includes at least one of the following: a third identifier and a timer, where the terminal is allowed or not allowed to report the assistance information within a runtime of the timer.

In some embodiments, the resource configuration apparatus 600 further includes:
a second receiving module, configured to receive the assistance information sent by the terminal.

In some embodiments, the network device includes at least one of the following:
a device supporting the first configuration;
a device supporting the first transmission mode;
a device not supporting the first configuration; and
a device not supporting the first transmission mode.

In some embodiments, the assistance information includes at least one of the following: area information; and
a configuration identifier corresponding to the area information.

In some embodiments, the area information includes at least one of the following:
a cell-related identifier;
an identifier of a network node;
a radio access network notification area;
a tracking area; and
a registration area.

In some embodiments, the cell-related identifier includes at least one of the following:
a physical cell identifier;
a cell global identifier;
a cell group identifier; and
a cell type identifier.

In some embodiments, the identifier of a network node includes at least one of the following:
a global gNB identifier; and
a gNB identifier.

In some embodiments, the configuration identifier includes at least one of the following:
a first identifier, where the first identifier is used to indicate a set of configurations related to transmission of a pre-configured PUSCH resource that are associated with the cell; and
a second identifier, where the second identifier is used to indicate a part of the set of configurations related to transmission of the pre-configured PUSCH resource that are associated with the cell.

In some embodiments, the second sending module 601 is further configured to: in a case in which at least a part of the first configuration is updated, perform a target operation, where the target operation includes:
sending a paging message to a terminal; and
forwarding the paging message to a base station in a target area via an anchor base station, where
the paging message is used to notify that the first configuration is updated.

In some embodiments, the second sending module 601 is further configured to send the updated first configuration to the terminal based on a radio resource control RRC connection resume procedure initiated by the terminal.

In some embodiments, when the terminal initiates the RRC connection resume procedure, a target object in unified access control is not configured or is configured as the first preset value, where the target object includes at least one of an access category and an access identity.

In some embodiments, the first preset value is a first value or a second value configured in an RRC layer or an upper layer, and the second value is a new value relative to the first value.

In some embodiments, a resume cause value of the RRC connection resume procedure includes at least one of the following:
a third value; and
a fourth value, where the fourth value is a new value relative to the third value.

In some embodiments, the fourth value is used to indicate at least one of the following:
a configuration update of the pre-configured PUSCH resource;
a configuration update of a pre-configured uplink resource PUR; and
a PUR configuration request.

The terminal provided in this embodiment of this application can implement the processes implemented by the terminal in the method embodiment of FIG. 4. To avoid repetition, details are not described herein again.

The apparatus for processing data sending and the resource configuration apparatus in the embodiments of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a Network Attached Storage (NAS), a Personal Computer (PC), a Television (TV), an automated teller machine, or a self-service machine. This is not specifically limited in the embodiments of this application.

The apparatus for processing data sending and the resource configuration apparatus in the embodiments of this application may be an apparatus with an operating system. The operating system may be an Android operating system, an iOS operating system, or another possible operating system. This is not specifically limited in the embodiments of this application.

The apparatus for processing data sending apparatus and the resource configuration apparatus provided in the embodiments of this application can implement the processes implemented in the method embodiments of FIG. 3 and FIG. 4, and achieve a same technical effect. To avoid repetition, details are not described herein again.

Figure 7:
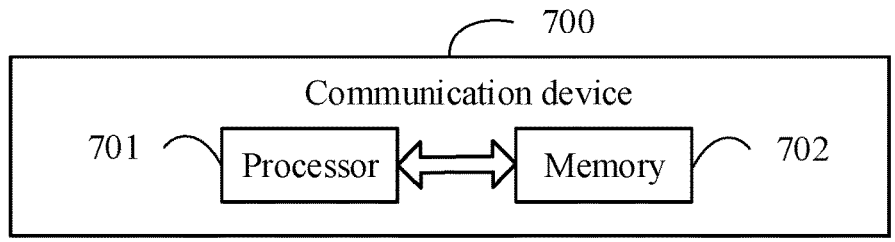
FIG. 7 is a structural diagram of a communication device according to an embodiment of this application.

For example, as shown in FIG. 7, an embodiment of this application further provides a communication device 700, including a processor 701, a memory 702, a program or an instruction that is stored in the memory 702 and that can run on the processor 701. For example, when the communication device 700 is a terminal, the program or the instruction is executed by the processor 701 to implement various processes in the method for processing data sending embodiments, and a same technical effect can be achieved. In a case in which the communication device 700 is a network device, when the program or the instruction is executed by the processor 701, various processes in the resource configuration method embodiment are implemented, and a same technical effect can be achieved. To avoid repetition, details are not described herein again.

Figure 8:
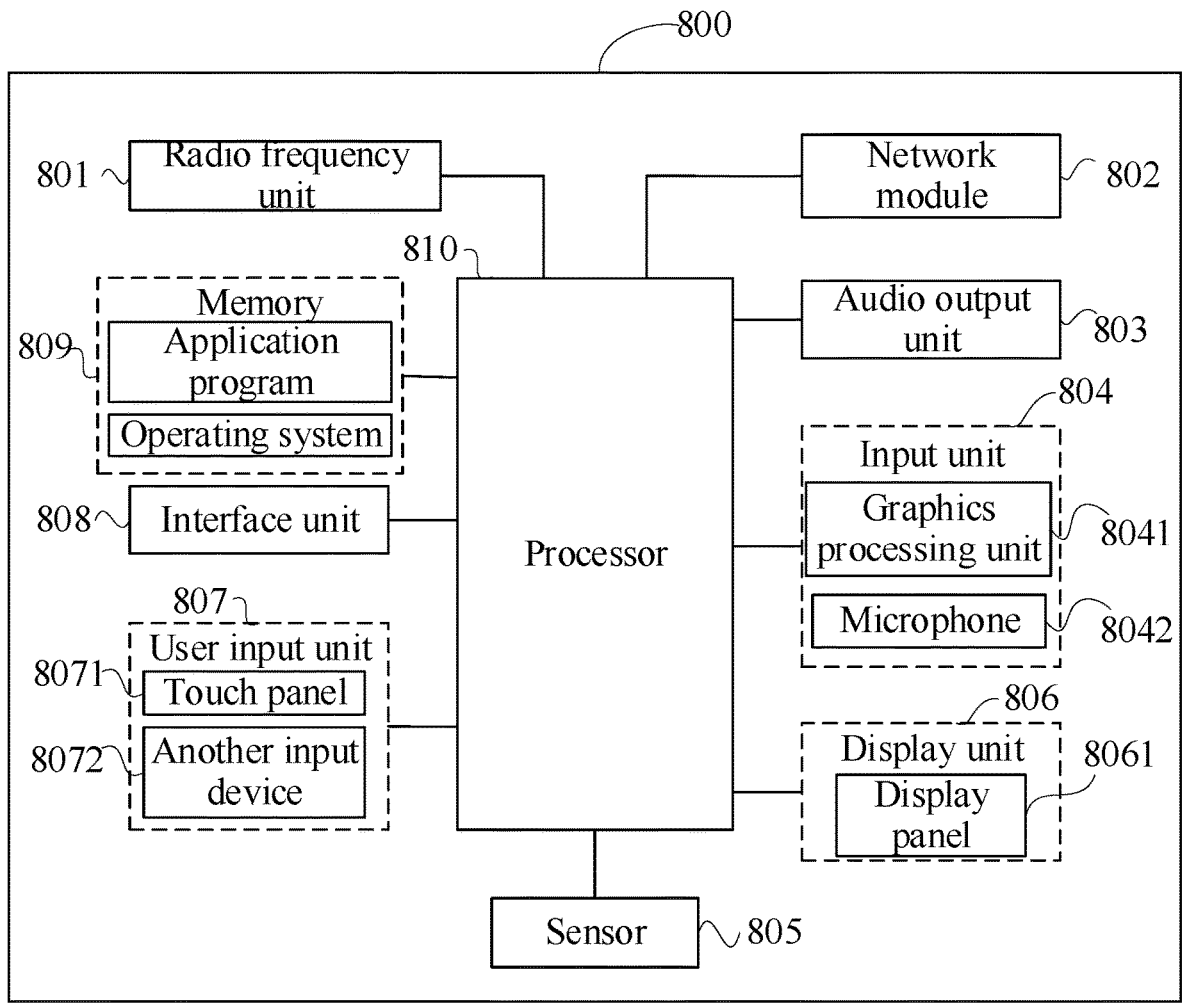
FIG. 8 is a structural diagram of a terminal according to an embodiment of this application.

FIG. 8 is a schematic diagram of a hardware structure of a terminal for implementing the embodiments of this application.

The terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

It may be understood by a person skilled in the art that the terminal 800 may further include a power supply (such as a battery) that supplies power to each component. The power supply may be logically connected to the processor 810 by using a power management system, to implement functions such as charging, discharging, and power consumption management by using the power management system. The terminal structure shown in FIG. 8 constitutes no limitation on the terminal, and the terminal may include more or fewer components than those shown in the figure, or combine some components, or have different component arrangements. Details are not described herein.

It should be understood that, in this embodiment of this application, the input unit 804 may include a Graphics Processing Unit (GPU) 8041 and a microphone 8042. The GPU 8041 processes image data of a static picture or a video obtained by an image capture apparatus (such as a camera) in a video capture mode or an image capture mode. The display unit 806 may include a display panel 8061, and the display panel 8061 may be configured in a form of a liquid crystal display, an organic light-emitting diode, or the like. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein.

In this embodiment of this application, the radio frequency unit 801 receives downlink data from a network device and then sends the downlink data to the processor 810 for processing; and sends uplink data to the network device. Usually, the radio frequency unit 801 includes but is not limited to an antenna, at least one amplifier, a transceiver, a coupler, a low noise amplifier, a duplexer, and the like.

The memory 809 may be configured to store a software program or an instruction and various data. The memory 109 may mainly include a program or instruction storage area and a data storage area. The program or instruction storage area may store an operating system, and an application or an instruction required by at least one function (for example, a sound playing function or an image playing function). In addition, the memory 809 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 810 may include one or more processing units. In some embodiments, an application processor and a modem processor may be integrated into the processor 810. The application processor mainly processes an operating system, a user interface, an application, an instruction, or the like. The modem processor mainly processes wireless communication, for example, a baseband processor. It can be understood that the modem processor may not be integrated into the processor 810.

The radio frequency unit 801 is configured to receive a first configuration sent by a network device, where the first configuration is a configuration related to transmission of a pre-configured physical uplink shared channel PUSCH resource, and is used to configure a dedicated uplink resource of at least one cell for the terminal; and sending uplink data based on the dedicated uplink resource of the at least one cell.

It should be understood that, in this embodiment, the processor 810 and the radio frequency unit 801 can implement processes implemented by the terminal in the method embodiment of FIG. 3. To avoid repetition, details are not described herein again.

Figure 9:
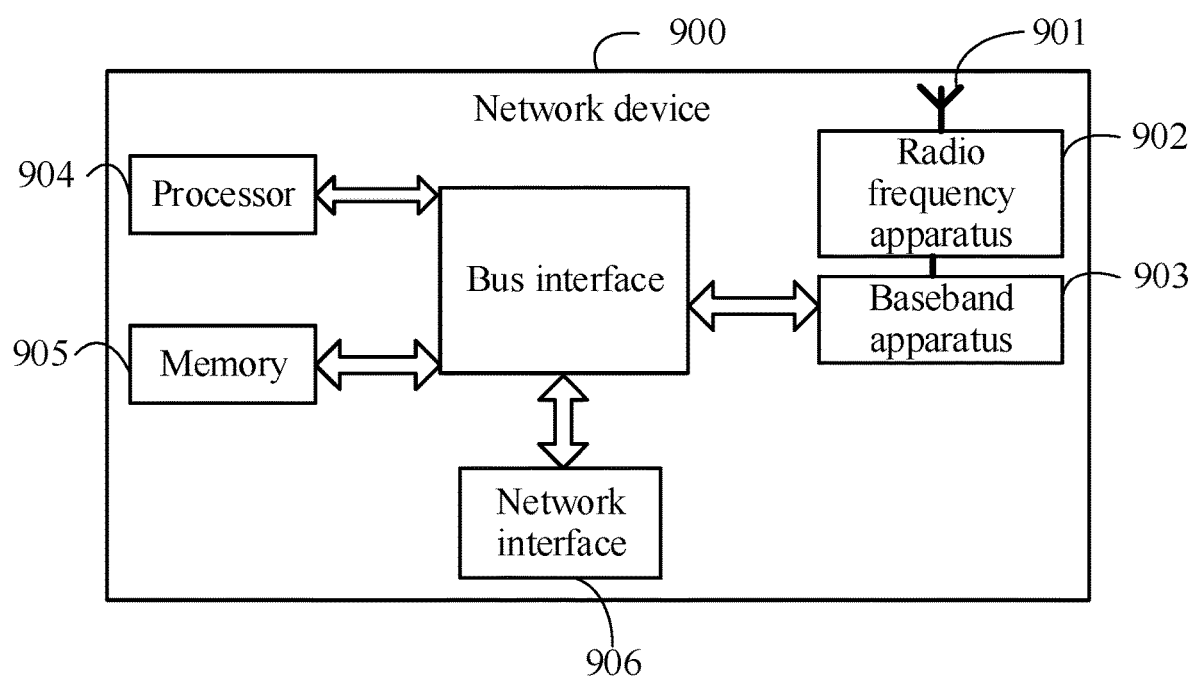
FIG. 9 is a structural diagram of a network device according to an embodiment of this application.

For example, an embodiment of this application further provides a network device. As shown in FIG. 9, a network device 900 includes an antenna 901, a radio frequency apparatus 902, and a baseband apparatus 903. The antenna 901 is connected to the radio frequency apparatus 902. In an uplink direction, the radio frequency apparatus 902 receives information through the antenna 901, and sends the received information to the baseband apparatus 903 for processing. In a downlink direction, the baseband apparatus 903 processes information to be sent and transmits the information to the radio frequency apparatus 902, and the radio frequency apparatus 902 processes the received information and then transmits the information through the antenna 901.

The frequency band processing apparatus may be located in the baseband apparatus 903. The method performed by the network device in the foregoing embodiment may be implemented in the baseband apparatus 903. The baseband apparatus 903 includes a processor 904 and a memory 905.

The baseband apparatus 903 may include, for example, at least one baseband board, where a plurality of chips are disposed on the baseband board. As shown in FIG. 9, one chip is, for example, the processor 904, which is connected to the memory 905, so as to invoke a program in the memory 905 to perform operations of the network device shown in the foregoing method embodiment.

The baseband apparatus 903 may further include a network interface 906, configured to exchange information with the radio frequency apparatus 902. For example, the interface is a Common Public Radio Interface (CPRI).

For example, the network device in this embodiment of this application further includes an instruction or a program that is stored in the memory 905 and that can be run on the processor 904. The processor 904 invokes the instruction or the program in the memory 905 to perform the method performed by the modules shown in FIG. 5, and a same technical effect is achieved. To avoid repetition, details are not described herein again.

An embodiment of this application further provides a readable storage medium. The readable storage medium stores a program or an instruction, and when the program or the instruction is executed by a processor, various processes of the foregoing method for processing data sending and resource configuration method embodiments are implemented, and a same technical effect can be achieved. To avoid repetition, details are not described herein again.

The processor is a processor in the electronic device in the foregoing embodiment. The readable storage medium includes a computer-readable storage medium such as an ROM, a Random Access Memory (RAM), a magnetic disk, an optical disc, or the like.

An embodiment of this application further provides a chip. The chip includes a processor and a communication interface, the communication interface is coupled to the processor, and the processor is configured to run a program or an instruction of a network device to implement the processes of the foregoing resource configuration method embodiments, and a same technical effect can be achieved. To avoid repetition, details are not described herein again.

It should be understood that the chip mentioned in this embodiment of this application may also be referred to as a system-level chip, a system chip, a system on chip, a system-on-a-chip, and the like.

It should be noted that, in this specification, the terms "include", "comprise", or their any other variant is intended to cover a non-exclusive inclusion, so that a process, a method, an article, or an apparatus that includes a list of elements not only includes those elements, but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a working process of the above described system, apparatus, and unit, reference may be made to a corresponding process in the above method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementation manners, a person skilled in the art may clearly understand that the method in the foregoing embodiment may be implemented by software in addition to a necessary universal hardware platform or by hardware only. In some embodiments, the technical solutions of this application, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a base station, or the like) to perform the method described in the embodiments of this application.

It can be understood that the embodiments described in the present disclosure may be implemented by hardware, software, firmware, middleware, microcode, or a combination thereof. For hardware implementation, a module, a unit, a subunit, or the like may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general purpose processor, a controller, a microcontroller, a microprocessor, another electronic unit configured to perform the functions described in the present disclosure, or a combination thereof.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A method for processing data sending, performed by a terminal, comprising:
receiving a first configuration sent by a network device, wherein the first configuration is a configuration related to transmission of a pre-configured Physical Uplink Shared Channel (PUSCH) resource, and is used to configure a dedicated uplink resource of at least one cell for the terminal; and
sending uplink data based on the dedicated uplink resource of the at least one cell,
wherein before receiving the first configuration sent by the network device, the method further comprises:
receiving second indication information sent by the network device, wherein the second indication information is used to indicate whether to allow the terminal to report assistance information, wherein the assistance information is used to determine the first configuration,
wherein the second indication information comprises: a third identifier and a timer,
wherein:
the terminal is allowed or not allowed to report the assistance information within a runtime of the timer, and
the third identifier is used to indicate whether to allow the terminal to report the assistance information.

2. The method according to claim 1, wherein the first configuration comprises at least one of the following:
area information; or
a configuration identifier corresponding to the area information,
wherein the configuration identifier comprises at least one of the following:
a first identifier, wherein the first identifier is used to indicate a set of configurations related to transmission of a pre-configured PUSCH resource that are associated with the at least one cell; and
a second identifier, wherein the second identifier is used to indicate a part of the set of configurations related to transmission of the pre-configured PUSCH resource that are associated with the at least one cell,
or
wherein the network device comprises at least one of the following:
a device supporting the first configuration;
a device supporting a first transmission mode:
a device not supporting the first configuration; or
a device not supporting the first transmission mode.

3. The method according to claim 2, wherein the area information comprises at least one of the following: a cell-related identifier; an identifier of a network node; a radio access network notification area: a tracking area; or a registration area,
wherein the cell-related identifier comprises at least one of the following: a physical cell identifier; a cell global identifier; a cell group identifier; and a cell type identifier; and
wherein the identifier of a network node comprises at least one of the following: a global gNB identifier; or a gNB identifier.

4. The method according to claim 1, wherein before receiving the first configuration sent by the network device, the method further comprises:
receiving first indication information sent by the network device, wherein the first indication information is used to indicate at least one of the following: whether the network device supports the first configuration; or whether the network device supports a first transmission mode.

5. The method according to claim 1,
wherein the assistance information comprises at least one of the following:
area information; and
a configuration identifier corresponding to the area information, wherein the configuration identifier comprises at least one of the following: a first identifier, wherein the first identifier is used to indicate a set of configurations related to transmission of a pre-configured PUSCH resource that are associated with the at least one cell; or a second identifier, wherein the second identifier is used to indicate a part of the set of configurations related to transmission of the pre-configured PUSCH resource that are associated with the at least one cell;
or
wherein a condition of initiating the terminal to send the assistance information to the network device comprises at least one of the following:
the network device allows the terminal to send the assistance information;
the terminal is interested in the first configuration or is interested in the first transmission mode;
the terminal is not interested in the first configuration or is not interested in the first transmission mode;
at least one item in the first configuration does not match a service feature of the terminal;
a serving cell does not belong to an area indicated by the first configuration;
the first configuration is updated;
a size of a medium access control protocol data unit comprising uplink data is less than or equal to a second preset value, wherein the second preset value is a transmit block size defined based on a type of the terminal;
a status of the terminal is an RRC connected state; or
a status of the terminal is a non-RRC connected state.

6. The method according to claim 4, wherein the area information comprises at least one of the following: a cell-related identifier; an identifier of a network node; a radio access network notification area; a tracking area; or a registration area,
  wherein the cell-related identifier comprises at least one of the following: a physical cell identifier: a cell global identifier; a cell group identifier; and a cell type identifier; and
  wherein the identifier of a network node comprises at least one of the following:
  a global gNB identifier: or a gNB identifier.

7. The method according to claim 1, wherein after receiving the first configuration sent by the network device, the method further comprises:
  receiving a paging message sent by the network device, wherein the paging message is used to notify the terminal about an update of the first configuration;
  initiating a Radio Resource Control (RRC) resume procedure; and
  receiving the updated first configuration sent by the network device based on the RRC resume procedure.

8. The method according to claim 7, wherein when the terminal initiates the RRC connection resume procedure, a target object in unified access control is not configured or is configured as the first preset value, wherein the target object comprises at least one of an access category or an access identity, wherein the first preset value is a first value or a second value configured in an RRC layer or an upper layer, and the second value is a new value relative to the first value.

9. The method according to claim 7, wherein a resume cause value of the RRC connection resume procedure comprises at least one of the following:
  a third value: or
  a fourth value, wherein the fourth value is a new value relative to the third value, wherein the fourth value is used to indicate at least one of the following:
  a configuration update of the pre-configured PUSCH resource;
  a configuration update of a Pre-configured Uplink Resource (PUR); or
  a PUR configuration request.

10. A resource configuration method, performed by a network device, comprising:
  sending a first configuration, wherein the first configuration is a configuration related to transmission of a pre-configured Physical Uplink Shared Channel (PUSCH) resource, and is used to configure a dedicated uplink resource of at least one cell for a terminal,
  wherein before sending the first configuration, the method farther comprises:
  sending second indication information to the terminal wherein the second indication information is used to indicate whether to allow the terminal reports assistance information, wherein the assistance information is used to determine the first configuration,
  wherein the second indication information comprises: a third identifier and a timer, wherein:
  the terminal is allowed or not allowed to report the assistance information within a runtime of the timer, and
  the third identifier is used to indicate whether to allow the terminal to report the assistance information.

11. The method according to claim 10, wherein the first configuration comprises at least one of the following:
  area information; or
  a configuration identifier corresponding to the area information,
  wherein the configuration identifier comprises at least one of the following:
    a first identifier, wherein the first identifier is used to indicate a set of configurations related to transmission of a pre-configured PUSCH resource that are associated with the at least one cell; or
    a second identifier, wherein the second identifier is used to indicate a part of the set of configurations related to transmission of the pre-configured PUSCH resource that are associated with the at least one cell; or
  wherein the network device comprises at least one of the following:
    a device supporting the first configuration;
    a device supporting a first transmission mode;
    a device not supporting the first configuration; and
    a device not supporting the first transmission mode.

12. The method according to claim 11, wherein the area information comprises at least one of the following: a cell-related identifier; an identifier of a network node; a radio access network notification area; a tracking area; or a registration area,
  wherein the cell-related identifier comprises at least one of the following: a physical cell identifier; a cell global identifier; a cell group identifier; or a cell type identifier, and
  wherein the identifier of a network node comprises at least one of the following: a global gNB identifier; or a gNB identifier.

13. The method according to claim 11, wherein in a case in which at least a part of the first configuration is updated, after performing the target operation, the method further comprises:
  sending the updated first configuration to the terminal based on a Radio Resource Control (RRC) connection resume procedure initiated by the terminal.

14. The method according to claim 13, wherein when the terminal initiates the RRC connection resume procedure, a target object in unified access control is not configured or is configured as the first preset value,
  wherein the target object comprises at least one of an access category and an access identity, wherein the first preset value is a first value or a second value configured in an RRC layer or an upper layer, and the second value is a new value relative to the first value.

15. The method according to claim 13, wherein a resume cause value of the RRC connection resume procedure comprises at least one of the following: a third value, or a fourth value,
  wherein the fourth value is a new value relative to the third value, wherein the fourth value is used to indicate at least one of the following:
  a configuration update of the pre-configured PUSCH resource;
  a configuration update of a Pre-configured Uplink Resource (PUR); or
  a PUR configuration request.

16. The method according to claim 10, wherein before sending the first configuration, the method further comprises:
  sending first indication information to the terminal, wherein the first indication information is used to indicate at least one of the following: whether the network device supports the first configuration: or whether the network device supports the first transmission mode.

17. The method according to claim 10,
wherein the assistance information comprises at least one of the following: area information: or a configuration identifier corresponding to the area information, wherein the configuration identifier comprises at least one of the following:
a first identifier, wherein the first identifier is used to indicate a set of configurations related to transmission of a pre-configured PUSCH resource that are associated with the at least one cell; or
a second identifier, wherein the second identifier is used to indicate a part of the set of configurations related to transmission of the pre-configured PUSCH resource that are associated with the at least one cell.

18. The method according to claim 17, wherein the area information comprises at least one of the following: a cell-related identifier; an identifier of a network node; a radio access network notification area; a tracking area; or a registration area,
wherein the cell-related identifier comprises at least one of the following: a physical cell identifier; a cell global identifier; a cell group identifier; or a cell type identifier, and
wherein the identifier of a network node comprises at least one of the following: a global gNB identifier; or a gNB identifier.

19. The method according to claim 10, wherein after sending the first configuration, the method further comprises:
in a case in which at least a part of the first configuration is updated, performing a target operation, wherein the target operation comprises:
sending a paging message to a terminal; or
forwarding the paging message to a base station in a target area via an anchor base station, wherein the paging message is used to notify that the first configuration is updated.

20. A terminal, comprising: a memory having a computer program stored thereon; and a processor, wherein the computer program, when executed by the processor, causes the processor to perform a method for processing data sending, comprising:
receiving a first configuration sent by a network device, wherein the first configuration is a configuration related to transmission of a pre-configured Physical Uplink Shared Channel (PUSCH) resource, and is used to configure a dedicated uplink resource of at least one cell for the terminal; and
sending uplink data based on the dedicated uplink resource of the at least one cell,
wherein before receiving the first configuration sent by the network device, the method further comprises:
receiving second indication information sent by the network device, wherein the second indication information is used to indicate whether to allow the terminal to report assistance information, wherein the assistance information is used to determine the first configuration,
wherein the second indication information comprises: a third identifier and a timer,
wherein:
the terminal is allowed or not allowed to report the assistance information within a runtime of the timer, and
the third identifier is used to indicate whether to allow the terminal to report the assistance information.

* * * * *